(12) United States Patent
Banerjee et al.

(10) Patent No.: US 9,311,442 B2
(45) Date of Patent: Apr. 12, 2016

(54) NET-VOLTAGE-AWARE OPTICAL PROXIMITY CORRECTION (OPC)

(71) Applicant: GLOBALFOUNDRIES INC., Grand Cayman (KY)

(72) Inventors: Shayak Banerjee, Hartsdale, NY (US); James A. Culp, New Paltz, NY (US); Ian P. Stobert, Hopewell Junction, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 200 days.

(21) Appl. No.: 14/261,632

(22) Filed: Apr. 25, 2014

(65) Prior Publication Data

US 2015/0310155 A1 Oct. 29, 2015

(51) Int. Cl.
*G06F 17/50* (2006.01)
*G03F 1/36* (2012.01)
*G03F 7/20* (2006.01)

(52) U.S. Cl.
CPC .............. *G06F 17/5081* (2013.01); *G03F 1/36* (2013.01); *G06F 17/5068* (2013.01); *G03F 7/70441* (2013.01); *G06F 2217/12* (2013.01)

(58) Field of Classification Search
None
See application file for complete search history.

(56) References Cited

U.S. PATENT DOCUMENTS

| 6,578,190 | B2* | 6/2003 | Ferguson | G03F 1/70 378/35 |
|---|---|---|---|---|
| 7,205,587 | B2 | 4/2007 | Fujimaki | |
| 7,910,419 | B2 | 3/2011 | Fenouillet-Beranger et al. | |
| 8,001,516 | B2* | 8/2011 | Smith | G06F 17/5068 716/100 |
| 8,302,068 | B2* | 10/2012 | Culp | G03F 1/36 716/139 |
| 8,383,256 | B1 | 2/2013 | Fu | |
| 8,572,517 | B2* | 10/2013 | Pramanik | G03F 1/144 716/50 |
| 8,799,830 | B2* | 8/2014 | Robles | G06F 17/5022 716/111 |
| 2002/0115240 | A1 | 8/2002 | Assaderaghi et al. | |
| 2012/0135566 | A1 | 5/2012 | Pinguet et al. | |

OTHER PUBLICATIONS

Banerjee et al., "Compensating Non-Optical Effects using Electrically-Driven Optical Proximity Correction," Design for Manufacturability through Design-Process Integration III, 2009, Proc. of SPIE, vol. 7275, 10 pages.*
Krasnoperova et al., "Process Window OPC for Reduced Process Variability and Enhanced Yield", Optical Microlithography XIX, Proc. of SPIE vol. 6154, 2006.

(Continued)

*Primary Examiner* — Leigh Garbowski
(74) *Attorney, Agent, or Firm* — Yuanmin Cai; Hoffman Warnick LLC

(57) ABSTRACT

Various embodiments include computer-implemented methods, computer program products and systems for verifying an integrated circuit (IC) layout. In some cases, approaches include a computer-implemented method of verifying an IC layout, the method including: obtaining data about a process variation band for at least one physical feature in the IC layout; determining voltage-based process variation band thresholds for the at least one physical feature in the IC layout; determining whether the process variation band for the at least one physical feature in the IC layout meets design specifications for the IC layout based upon the voltage-based process variation band thresholds for the at least one physical feature in the IC layout; and modifying the IC layout in response to a determination that the process variation band for the at least one physical feature does not meet the design specifications.

19 Claims, 6 Drawing Sheets

(56) References Cited

OTHER PUBLICATIONS

Lienig, Jens, Invited Talk: Introduction to Electromigration-Aware Physical Design, Dresden University of Technology, Institute of Electromechanical and Electronic Design, Dresden Germany.

Raghavan et al., "Statistical Outlook into the Physics of Failure for Copper Low-K Intra-Metal Dielectric Breakdown", IEEE, 47th Annual International Reliability Physics Symposium, Montreal 2009.

Teh et al., "Design-Process Integration for Performance-based OPC Framework", Department of Electrical and Computer Engineering, National University of Singapore, Singapore.

Tu et al, "Physics and material challenges for lead-free solders", Journal of Applied Physics 93, 1335 (2003).

* cited by examiner

| Net-Voltage aware retargeting table 400 ||||||
| --- | --- | --- | --- | --- |
| Spacing (um) | Width (um) | Self-voltage (V) | Neighbor voltage (V) | CATOPC Value ($\Delta W_{OPC}$) |
| $S_{min,1} < s < S_{max,1}$ | $W_{min} < W < W_{max}$ | 1.0 | 1.0 | $0.5 \times (s - X_1)$ |
| $S_{min,2} < s < S_{max,2}$ | $W_{min} < W < W_{max}$ | 1.0 | 1.5 | $0.5 \times (s - X_2)$ |
| $S_{min,3} < s < S_{max,3}$ | $W_{min} < W < W_{max}$ | 1.5 | 1.5 | $0.5 \times (s - X_3)$ |

FIG. 4

NET-VOLTAGE-AWARE OPTICAL PROXIMITY CORRECTION (OPC)

BACKGROUND

Aspects of the invention relate generally to integrated circuits. More particularly, various aspects of the invention relate to metrology in integrated circuits.

Developing and testing integrated circuit (IC) devices, also referred to as semiconductor devices, involves designing, manufacturing and testing these devices according to desired operating parameters. Quality assurance has been a concern in the development, fabrication and testing of IC devices, but is particularly important as these devices become ever more complex.

Optical proximity correct (OPC) is known in the art as a photolithography enhancement mechanism used to compensate for errors in forming images due to diffraction and/or process effects. OPC helps to compensate for the inability of light to maintain edge placement integrity when used to form shapes, e.g., IC lines, vias, connections, switches, etc. OPC corrects for errors by adding polygons, moving edges, or otherwise modifying a photomask to compensate for the deviation caused by the light used in the subsequent lithography steps. OPC is conventionally performed in a feedback-based process, where a target shape is used to design a mask, which is then modified according to an OPC algorithm, and then a final contour is formed based upon the mask produced by the OPC algorithm. In some cases, the final contour can be produced (either physically or in simulation) in order to test the OPC algorithm and/or drive changes to that algorithm.

The OPC algorithms are conventionally based upon process variation bands, which is a statistical indicator of the likelihood of one or more portions of the IC fabrication process forming an element that deviates from the target. Process variation band based calculations conventionally focus on physical parameters such as minimum widths of lines, vias, devices (transistors, etc.) as well as minimum spacings between the lines, vias and/or devices in order to design the OPC algorithm. These conventional process variation band based calculations assume that these physical parameters are uniform across all elements (e.g., lines, vias, devices, etc.) in an IC layout. However, these conventional process variation band based calculations can be less reliable as devices begin to shrink in scale, particularly when focused on electrical parameters. Interactions with electrical parameters can lead to voltage and current-dependent failures such as time-dependent dielectric breakdown (TDDB) and electromigration.

BRIEF SUMMARY

Various embodiments include computer-implemented methods, computer program products and systems for verifying an integrated circuit (IC) layout. In some cases, approaches include a computer-implemented method of verifying an IC layout, the method including: obtaining data about a process variation band for at least one (physical) feature in the IC layout; determining voltage-based process variation band thresholds for the at least one feature in the IC layout; determining whether the process variation band for the at least one feature in the IC layout meets design specifications for the IC layout based upon the voltage-based process variation band thresholds for the at least one feature in the IC layout; and modifying the IC layout in response to a determination that the process variation band for the at least one feature does not meet the design specifications.

A first aspect includes a computer-implemented method of verifying an IC layout, the method including: obtaining data about a process variation band for at least one (physical) feature in the IC layout; determining voltage-based process variation band thresholds for the at least one feature in the IC layout; determining whether the process variation band for the at least one feature in the IC layout meets design specifications for the IC layout based upon the voltage-based process variation band thresholds for the at least one feature in the IC layout; and modifying the IC layout in response to a determination that the process variation band for the at least one feature does not meet the design specifications.

A second aspect includes a system having: at least one computing device configured to verify an integrated circuit (IC) layout by performing actions including: obtaining data about a process variation band for at least one (physical) feature in the IC layout; determining voltage-based process variation band thresholds for the at least one feature in the IC layout; determining whether the process variation band for the at least one feature in the IC layout meets design specifications for the IC layout based upon the voltage-based process variation band thresholds for the at least one feature in the IC layout; and modifying the IC layout in response to a determination that the process variation band for the at least one feature does not meet the design specifications.

A third aspect includes a computer program product including program code stored on a computer readable storage medium, which when executed by at least one computing device, causes the at least one computing device to verify an integrated circuit (IC) layout by performing actions including: obtaining data about a process variation band for at least one (physical) feature in the IC layout; determining voltage-based process variation band thresholds for the at least one feature in the IC layout; determining whether the process variation band for the at least one feature in the IC layout meets design specifications for the IC layout based upon the voltage-based process variation band thresholds for the at least one feature in the IC layout; and modifying the IC layout in response to a determination that the process variation band for the at least one feature does not meet the design specifications.

BRIEF DESCRIPTION OF THE DRAWINGS

FIG. 4 shows a look-up table according to various embodiments.

Figure 1:
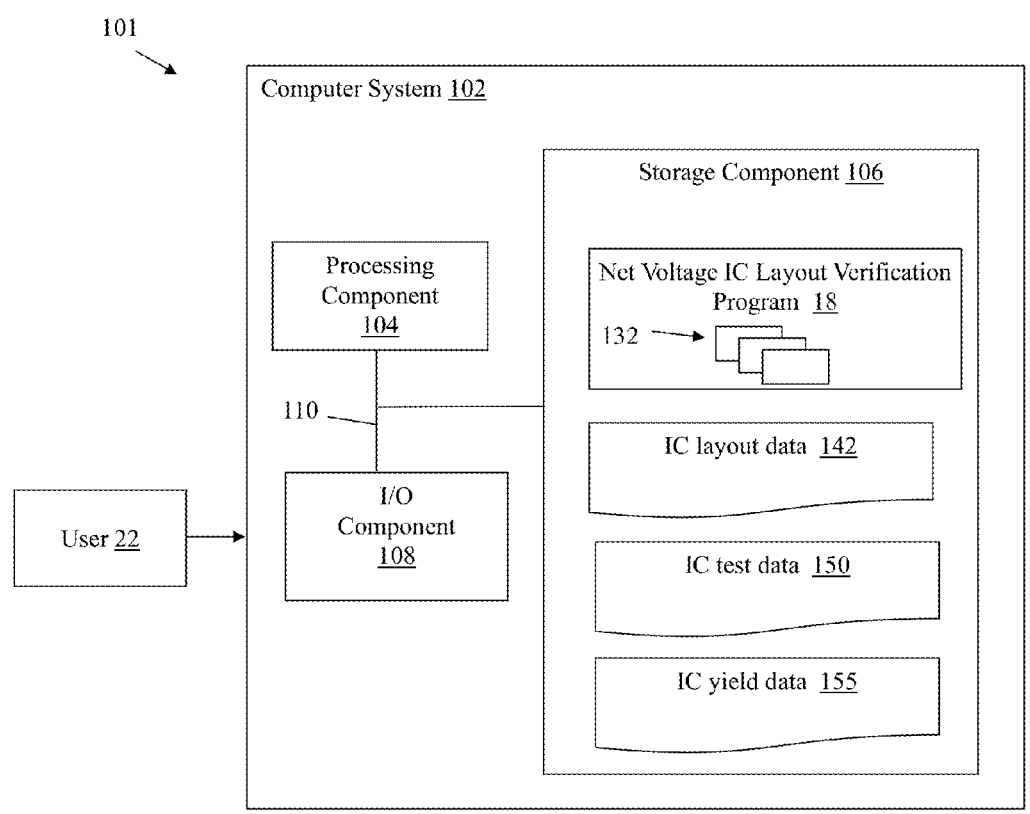
FIG. 1 shows a schematic environment for implementing a net-voltage IC layout verification program according to various embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

This invention relates generally to integrated circuits. More particularly, various aspects of the invention relate to model building in integrated circuits.

As described herein, optical proximity correction (OPC) algorithms are conventionally based upon process variation, which is a statistical indicator of the likelihood of one or more portions of the integrated circuit (IC) fabrication process forming an element that deviates from the target. Process variation calculations conventionally focus on physical parameters such as minimum widths of lines, vias, devices (transistors, etc.) as well as minimum spacings between the lines, vias and/or devices in order to make rules. These conventional process variation calculations assume that these physical parameters are uniform across all elements (e.g., lines, vias, devices, etc.) in an IC layout. However, these conventional process variation calculations can be less reliable as devices begin to shrink in scale, particularly when focused on physical parameters. As the reliability of physical parameters reduces, their interaction with electrical parameters increases, relating to several electrical related physical defects such as time-dependent dielectric breakdown (TDDB) and electromigration.

Various aspects described herein utilize voltage characteristics to develop OPC algorithms, instead of simply using physical parameters as in the conventional approaches. These voltage characteristics can help to enhance the accuracy of the OPC algorithms as compared to conventional approaches, providing for enhanced accuracy in IC manufacturing.

Various embodiments include computer-implemented methods, computer program products and systems for verifying an integrated circuit (IC) layout. In some cases, approaches include a computer-implemented method of verifying an IC layout, the method including: obtaining data about a process variation band for at least one feature in the IC layout; determining voltage-based process variation band thresholds for the at least one feature in the IC layout; determining whether the process variation band for the at least one feature in the IC layout meets design specifications for the IC layout based upon the voltage-based process variation band thresholds for the at least one feature in the IC layout; and modifying the IC layout in response to a determination that the process variation band for the at least one feature does not meet the design specifications.

Additional particular embodiments include a system having: at least one computing device configured to verify an integrated circuit (IC) layout by performing actions including: obtaining data about a process variation band for at least one feature in the IC layout; determining voltage-based process variation band thresholds for the at least one feature in the IC layout; determining whether the process variation band for the at least one feature in the IC layout meets design specifications for the IC layout based upon the voltage-based process variation band thresholds for the at least one feature in the IC layout; and modifying the IC layout in response to a determination that the process variation band for the at least one feature does not meet the design specifications.

Various other embodiments include a computer program product including program code stored on a computer readable storage medium, which when executed by at least one computing device, causes the at least one computing device to verify an integrated circuit (IC) layout by performing actions including: obtaining data about a process variation band for at least one feature in the IC layout; determining voltage-based process variation band thresholds for the at least one feature in the IC layout; determining whether the process variation band for the at least one feature in the IC layout meets design specifications for the IC layout based upon the voltage-based process variation band thresholds for the at least one feature in the IC layout; and modifying the IC layout in response to a determination that the process variation band for the at least one feature does not meet the design specifications.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Turning to the drawings, FIG. 1 depicts an illustrative environment 101 for verifying an IC layout according to embodiments. To this extent, the environment 101 includes a computer system 102 that can perform a process described herein in order to verify an IC layout. In particular, the computer system 102 is shown as including a net voltage IC layout verification program 18, which makes computer system 102 operable to verify an IC layout by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the net voltage IC layout verification program 18, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a user (e.g., a human or other user) 22 to interact with the computer system 102 and/or one or more communications devices to enable a system user 22 to communicate with the computer system 102 using any type of communications link. To this extent, the net voltage IC layout verification program 18 can manage a set of interfaces (e.g., graphical user interface(s), application program interface, etc.) that enable human and/or system users 22 to interact with the net voltage IC layout verification program 18. Further, the net voltage IC layout verification program 18 can manage (e.g., store, retrieve, create, manipulate, organize, present, etc.) data, such as IC layout data and/or IC test data (including wafer and chip-level data) using any solution.

In any event, the computer system 102 can comprise one or more general purpose computing articles of manufacture (e.g., computing devices) capable of executing program code, such as the net voltage IC layout verification program 18, installed thereon. As used herein, it is understood that "program code" means any collection of instructions or algorithms, in any language, code or notation, that cause a computing device having an information processing capability to perform a particular function either directly or after any combination of the following: (a) conversion to another language, code or notation; (b) reproduction in a different material form; and/or (c) decompression. To this extent, the net voltage IC layout verification program 18 can be embodied as any combination of system software and/or application software.

Further, the net voltage IC layout verification program 18 can be implemented using a set of modules 132. In this case, a module 132 can enable the computer system 102 to perform a set of tasks used by the net voltage IC layout verification program 18, and can be separately developed and/or implemented apart from other portions of the net voltage IC layout verification program 18. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of net voltage IC layout verification program 18 fixed thereon (e.g., one or more modules 132). However, it is understood that the computer system 102 and net voltage IC layout verification program 18 are only representative of various possible equivalent computer systems that may perform a process described herein. To this extent, in other embodiments, the functionality provided by the computer system 102 and net voltage IC layout verification program 18 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as IC layout data 142, IC test data 150 and/or IC yield data 155 using any solution. For example, the computer system 102 can generate and/or be used to retrieve IC layout data 142, IC test data 150 and/or IC yield data 155 from one or more data stores, receive IC layout data 142, IC test data 150 and/or IC yield data 155 from another system, send IC layout data 142, IC test data 150 and/or IC yield data 155 to another system, etc. IC layout data 142 can include data about a layout of an IC, including design parameters such as spacings, tolerances, dimensions (e.g., line widths), intended current levels, etc., IC test data 150 can include data gathered from testing (either through simulation or physical testing of product(s)) at least a portion of an IC to verify one or more of the design parameters, and IC yield data 155 can include data such as predicted and/or actual yield data about one or more production processes in the formation of the IC (including chip-level, wafer-level, and/or wafer-level data) or a component of the IC (e.g., one or more chip packages).

While shown and described herein as methods, systems, and computer program products for verifying an IC layout using net-voltage based calculations, it is understood that aspects of the invention further provide various alternative embodiments. For example, in one embodiment, the invention provides a computer program fixed in at least one computer-readable medium, which when executed, enables a computer system to verify an IC layout using net-voltage based calculations. To this extent, the computer-readable medium includes program code, such as the net voltage IC layout verification program 18 (FIG. 1), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the net voltage IC layout verification program 18 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for verifying an IC layout using net-voltage based calculations. In this case, a computer system, such as the computer system 102 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

Figure 2:
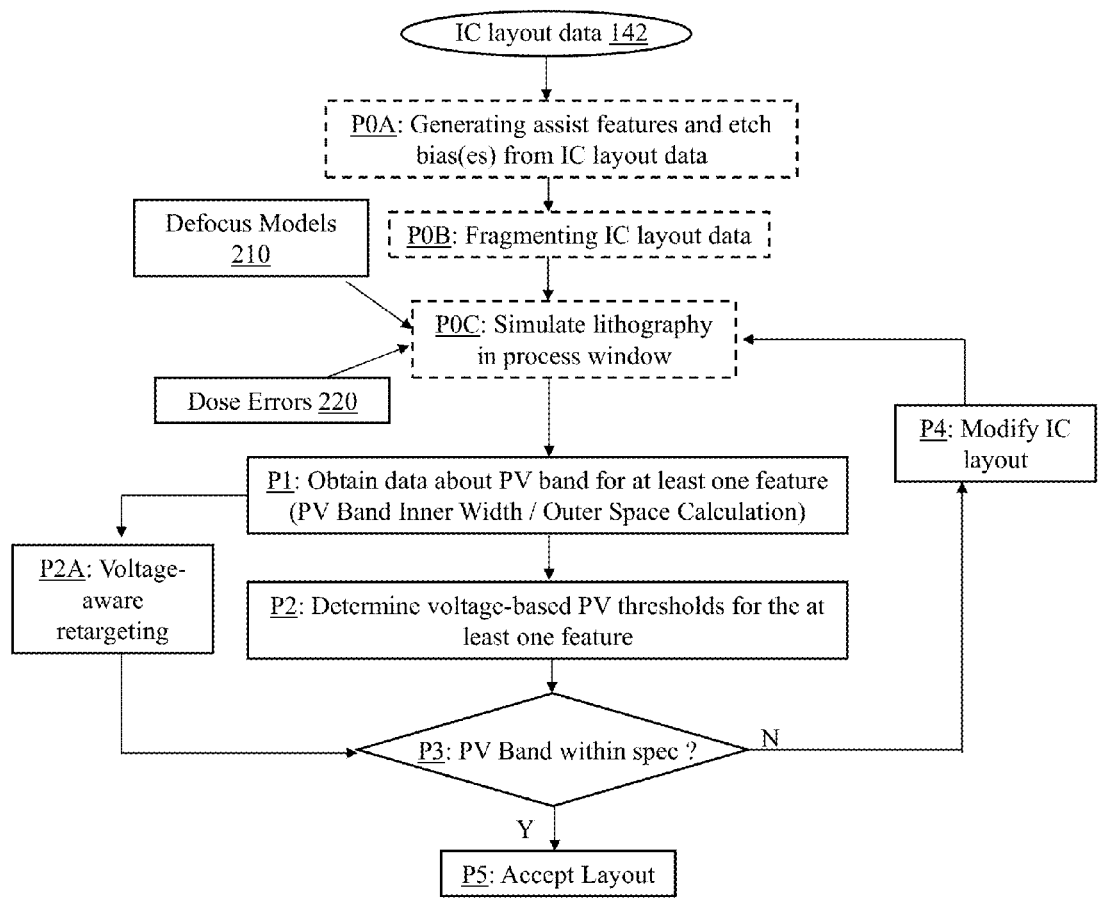
FIG. 2 shows a flow diagram depicting processes according to various embodiments.

FIG. 2 is an illustrative flow diagram depicting processes performed according to various embodiments. It is understood that various processes are depicted as optional pre and/or post-processes that may be performed in accordance with the various embodiments described herein. However, it is understood that processes depicted with dashed outlines (e.g., dashed boxes or other polygons) may be optional processes. The method can include the following processes:

Pre-process P0A: generating assist features and etch bias (es) from an IC layout (e.g., IC layout data 142). This optional pre-process includes creating features in photolithography assists and etch bias(es) in order to form features included in the IC layout data 142. In some cases, the IC layout data 142 can take the form of conventional chip layout data in a design file such as GDS or OASIS.

Pre-process P0B: fragmenting the IC layout data 142 along with the assist features and etch bias in order to separate the layout into distinct components.

Pre-process P0C: simulating a lithographic contour of the IC layout (e.g., simulating one or more fragmented portions of the IC layout). This simulation can account for defocus models 210 (how focusing affects formation of IC features) and/or dose errors 220 (how dosing affects formation of IC features) that affect how one or more features of the IC are formed through lithography.

Process P1 (in some cases, following pre-process(es) outlined herein): obtaining data about a process variation (PV) band for at least one feature in the IC layout. In some cases (shown in parenthetical), this process can include calculating the process variation band for the at least one feature in the IC layout. In various embodiments, the process variation band is generated by simulating multiple lithographic contours at different dose and focus conditions, followed by an XOR operation on the contours. The PV band represents the largest and the smallest limits at which a feature can print. An inner width calculation and an outer space calculation for the at least one feature can also be performed based on the PV band. As the outer edge of the band represents the largest that the feature can print, the distance measured between outer edges of adjacent bands defines the PV band outer space, which represents the risk of two features merging with one another—thus leading to electrical shorts. Similarly, the inner width of a feature is measured by the distance between the inner edges of the PV band for one feature. As is known in the art, determining the process variation bands (e.g., inner width and outer space) can include determining how the fabrication processes may affect formation of the at least one IC chip, e.g., how one or more fabrication processes can cause formation of an IC chip product that naturally or statistically varies from the designed IC chip. In this case, the process variation can be calculated based upon both the IC layout data 142 and user input data. As used herein, the term "at least one feature" can refer to one or more physical IC features such as, IC lines, vias, connections, switches, spacings between such IC components, etc. However, in other embodiments, the process variation bands can be obtained from a data store, record or other file that includes the already calculated process variation bands (e.g., inner width and outer space calculation) for the at least one feature.

Process P2 (following process P1): determining voltage-based process variation band thresholds for the at least one feature in the IC layout. According to various embodiments, the voltage-based process variation band thresholds for the at least one feature include an inner voltage threshold for the at least one feature and an outer voltage threshold for the at least one feature. As with conventional cost functions in process-window OPC, the cost function used according to various embodiments herein determines when a particular feature violates a PV band. However, in contrast to the conventional cost functions in process-window OPC, the cost function utilized according to various embodiments accounts for electrical characteristics of the at least one feature (e.g., net voltage, or $V_{net}$), and does not simply focus on physical characteristics of the feature(s). In some embodiments, the cost function for the OPC algorithm according to various embodiments can include a summation formula based on voltage-based process variation band thresholds:

$$\sum_i [PV_{thresh,in}(V_{net}) - PV_{in,i}] + \sum_j [PV_{thresh,out}(V_{net}) - PV_{out,j}] \quad \text{(Eq. 1)}$$

Where: $V_{net}$=net voltage for the at least one feature; $PV_{thresh,\ in}$=process variation band inner threshold; $PV_{thresh,\ out}$=process variation band outer threshold; $PV_{in,i}$=inner process variation band; and $PV_{out,j}$=outer process variation band.

Figure 3:
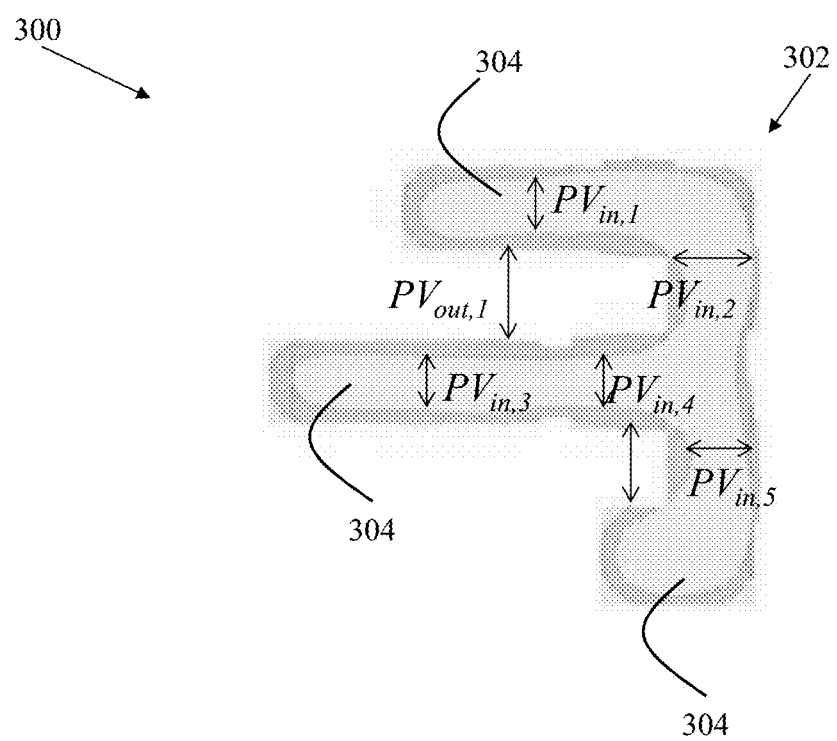
FIG. 3 shows an example depiction of a layout/masking diagram according to various embodiments.

FIG. 3 shows a schematic depiction of a layout/mask diagram 300, illustrating example threshold values that may be used in the summation formula in equation 1 (Eq. 1). The layout/mask diagram 300 shows an IC feature 302, which in this case, includes a line having several segments 304. The segments 304 have widths and spacings indicated by process variation band thresholds, in this case, by voltage-based process variation band thresholds, e.g., inner thresholds $PV_{in1}$, $PV_{in,2}$, etc., as well as outer thresholds, e.g., $PV_{out,\ 1}$.

In some embodiments, the underlying value for the inner threshold(s) of the PV bands can be determined based upon a mean time to failure model, known in the art. This mean time to failure model can be characterized by the following equation:

$$t_{50} = Aj^{-2}\exp\left(\frac{\Delta H}{kT}\right) \cdot f(W) \quad \text{(Eq. 2)}$$

Where: $t_{50}$=mean time to failure; A=wire area; T=temperature of the wire; k=Boltzmann constant; W=wire width; $\Delta H$=activation energy, and j=current density.

In some embodiments, the underlying value for the outer threshold(s) of the PV bands can be determined based upon a target failure time model, known in the art. The target failure time model can be characterized by the following equation:

$$\tau_{BD} = A\ \exp\left(\frac{E_a - \xi \cdot q\lambda E/L}{kT}\right) \quad \text{(Eq. 3)}$$

Where: $T_{BD}$=time of dielectric breakdown; L=spacing between adjacent wires; T=temperature of wire; A=wire area; $E_a$=activation energy; k=Boltzmann constant; q=charge; E=electric field; and $\xi$=a fitting constant.

Process P3 (following process P2): determining whether the process variation band for the at least one feature in the IC layout meets design specifications (spec) for the IC layout based upon the voltage-based PV band thresholds for the at least one feature in the IC layout. It is understood that the process of comparing the PV band for the at least one feature with the design specifications for the IC layout can include determining whether the original PV band determined in process P1 properly accounts for the voltage-based PV band thresholds determined in Process P2. That is, process P3 includes comparing the process variation band for the at least one feature in the IC layout, including accounting for the voltage-based PV band threshold, with the design specifications for the IC layout.

Process P4 (following process P3): modifying the IC layout in response to determining the process variation band for the at least one feature does not meet the design specifications. This can include providing instructions to modify the IC layout data to correct one or more features and comply with the process variation band.

Process P5 (following process P3): accepting the IC layout in response to determining the process variation band for the at least one feature does meet the design specifications.

Returning to Process P2, in an alternative embodiment, the process of determining voltage-based process variation band thresholds can be performed according to a voltage-aware retargeting approach in process P2A (illustrated with dashed box). This voltage-aware retargeting approach includes determining: a width of the at least one feature, a spacing between the at least one feature and an adjacent feature, a net voltage of the at least one feature, and a net voltage of the adjacent feature. Following determination of these characteristics of the at least one feature, the voltage-aware retargeting approach can include proceeding with process P3 as noted herein, using a look-up table 400 as shown in FIG. 4 to determine whether the characteristics (e.g., width, spacing, net voltage, etc.) of the at least one feature meet the design specifications delineated in that table 400.

EXAMPLES

Figure 5:
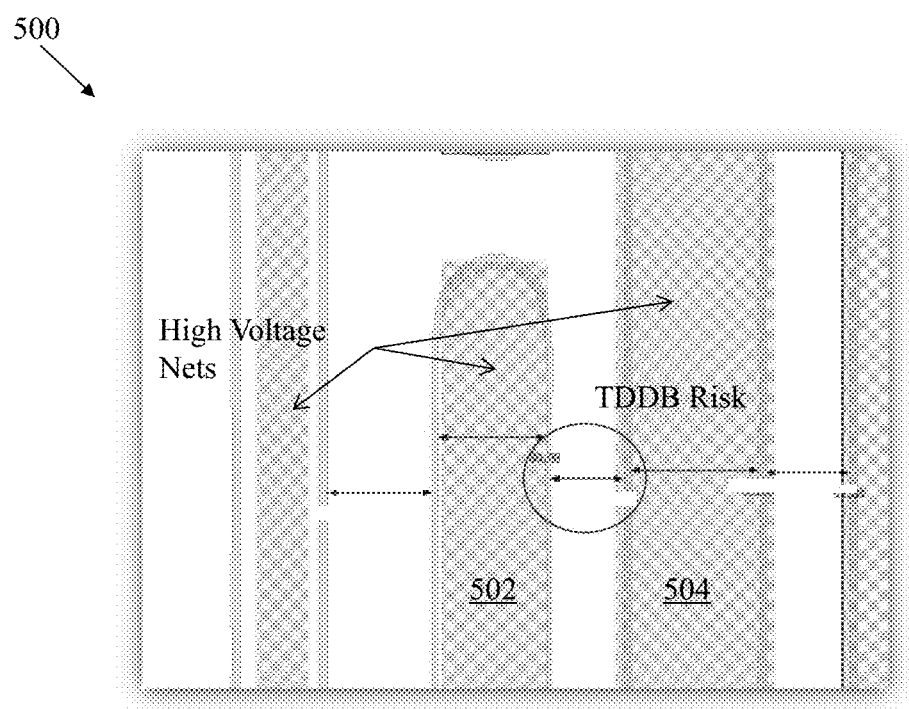
FIG. 5 shows a schematic IC layout according to the prior art.
Figure 6:
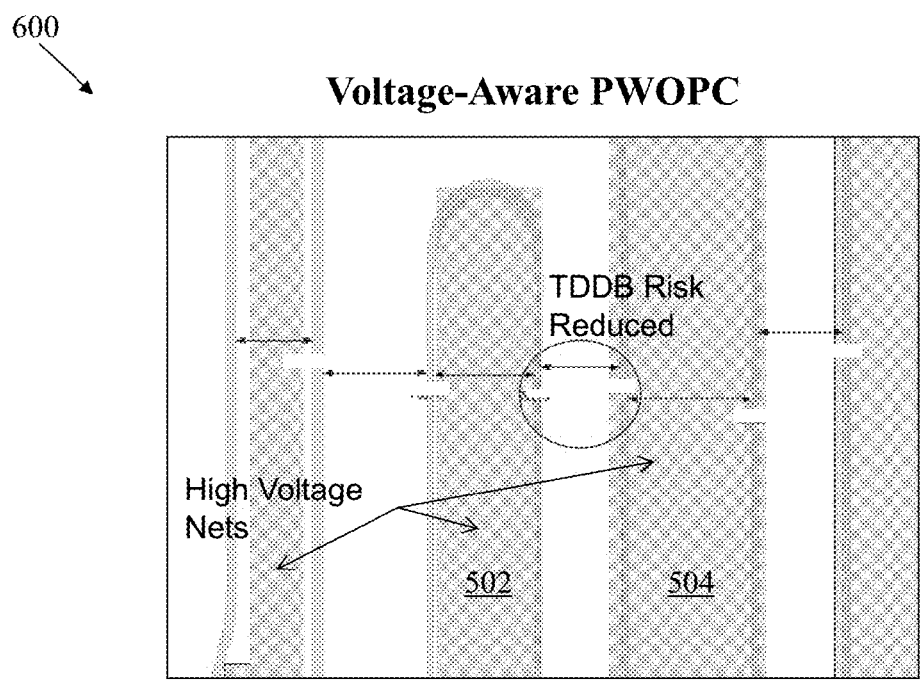
FIG. 6 shows a schematic IC layout according to various embodiments.

FIGS. 5-6 illustrate two schematic IC layouts 500 (FIG. 5) and 600 (FIG. 6) that illustrate how the voltage-aware OPC processes described herein (shown in (b)) can reduce the risk of, e.g., temperature-dependent dielectric breakdown (TDDB) by improving IC layout design. For example, as shown in FIG. 5, prior art IC layout 500 in FIG. 5 includes a TDDB Risk between adjacent lines 502 and 504, while IC layout 600 (in FIG. 6), according to various embodiments herein, shows a reduced TDDB Risk between lines 502 and 504. This reduced risk is due to OPC that accounts for net-voltage effects in the IC layout 600.

It is understood that aspects of the invention can be implemented as part of a business method that performs a process described herein on a subscription, advertising, and/or fee basis. That is, a service provider could offer to generate a scatterometry library as described herein. In this case, the service provider can manage (e.g., create, maintain, support, etc.) a computer system, such as computer system 102 (FIG. 1), that performs a process described herein for one or more customers. In return, the service provider can receive payment from the customer(s) under a subscription and/or fee agreement, receive payment from the sale of advertising to one or more third parties, and/or the like.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method, performed on at least one computing device, of verifying an integrated circuit (IC) layout, the method comprising:
   obtaining data about a process variation band for at least one physical feature in the IC layout;

determining electrical voltage-based process variation band thresholds for the at least one physical feature in the IC layout;

determining whether the process variation band for the at least one physical feature in the IC layout meets design specifications for the IC layout based upon the voltage-based process variation band thresholds for the at least one physical feature in the IC layout; and modifying the IC layout in response to a determination that the process variation band for the at least one physical feature does not meet the design specifications.

2. The computer-implemented method of claim 1, wherein the process variation band includes a process variation range having an inner width calculation and an outer space calculation for the at least one physical feature.

3. The computer-implemented method of claim 1, wherein the voltage-based process variation band thresholds for the at least one physical feature include an inner voltage threshold for the at least one physical feature and an outer voltage threshold for the at least one physical feature.

4. The computer-implemented method of claim 3, wherein the determining of the electrical voltage-based process variation band thresholds for the at least one physical feature in the IC layout includes utilizing a cost function according to the following:

$$\sum_i [PV_{thresh,in}(V_{net}) - PV_{in,i}] + \sum_j [PV_{thresh,out}(V_{net}) - PV_{out,j}]$$

wherein $V_{net}$=net voltage for the at least one physical feature; $PV_{thresh, in}$=process variation inner threshold; $PV_{thresh, out}$=process variation outer threshold; $PV_{in,i}$=inner process variation; and $PV_{out,j}$=outer process variation.

5. The computer-implemented method of claim 3, wherein the inner voltage threshold is determined based upon a mean time to failure model.

6. The computer-implemented method of claim 3, wherein the outer voltage threshold is determined based upon a target failure time model.

7. The computer-implemented method of claim 1, wherein the determining of the voltage-based process variation band thresholds includes determining: a width of the at least one physical feature, a spacing between the at least one physical feature and an adjacent physical feature, a net voltage of the at least one physical feature, and a net voltage of the adjacent physical feature.

8. A system comprising:
at least one computing device configured to verify an integrated circuit (IC) layout by performing actions including:
obtaining data about a process variation band for at least one physical feature in the IC layout;
determining voltage-based process variation band thresholds for the at least one physical feature in the IC layout;
determining whether the process variation band for the at least one physical feature in the IC layout meets design specifications for the IC layout based upon the voltage-based process variation band thresholds for the at least one physical feature in the IC layout; and
modifying the IC layout in response to a determination that the process variation band for the at least one physical feature does not meet the design specifications.

9. The system of claim 8, wherein the voltage-based process variation band thresholds for the at least one physical feature include an inner voltage threshold for the at least one physical feature and an outer voltage threshold for the at least one physical feature.

10. The system of claim 9, wherein the determining of the electrical voltage-based process variation band thresholds for the at least one physical feature in the IC layout includes utilizing a cost function according to the following:

$$\sum_i [PV_{thresh,in}(V_{net}) - PV_{in,i}] + \sum_j [PV_{thresh,out}(V_{net}) - PV_{out,j}]$$

wherein $V_{net}$=net voltage for the at least one physical feature; $PV_{thresh, in}$=process variation inner threshold; $PV_{thresh, out}$=process variation outer threshold; $PV_{in,i}$=inner process variation; and $PV_{out,j}$=outer process variation.

11. The system of claim 9, wherein the inner voltage threshold is determined based upon a mean time to failure model.

12. The system of claim 9, wherein the outer voltage threshold is determined based upon a target failure time model.

13. The system of claim 8, wherein the determining of the voltage-based process variation band thresholds includes determining: a width of the at least one physical feature, a spacing between the at least one physical feature and an adjacent physical feature, a net voltage of the at least one physical feature, and a net voltage of the adjacent physical feature.

14. A computer program product comprising program code stored on a non-transitory computer readable storage medium, which when executed by at least one computing device, causes the at least one computing device to verify an integrated circuit (IC) layout by performing actions including:
obtaining data about a process variation band for at least one physical feature in the IC layout;
determining voltage-based process variation band thresholds for the at least one physical feature in the IC layout;
determining whether the process variation band for the at least one physical feature in the IC layout meets design specifications for the IC layout based upon the voltage-based process variation band thresholds for the at least one physical feature in the IC layout; and
modifying the IC layout in response to a determination that the process variation band for the at least one physical feature does not meet the design specifications.

15. The computer program product of claim 14, wherein the voltage-based process variation band thresholds for the at least one physical feature include an voltage inner threshold for the at least one physical feature and an outer voltage threshold for the at least one physical feature.

16. The computer program product of claim 15, wherein the determining of the electrical voltage-based process variation band thresholds for the at least one physical feature in the IC layout includes utilizing a cost function according to the following:

$$\sum_i [PV_{thresh,in}(V_{net}) - PV_{in,i}] + \sum_j [PV_{thresh,out}(V_{net}) - PV_{out,j}]$$

wherein $V_{net}$=net voltage for the at least one physical feature; $PV_{thresh,\ in}$=process variation inner threshold; $PV_{thresh,\ out}$=process variation outer threshold; $PV_{in,i}$=inner process variation; and $PV_{out,j}$=outer process variation.

17. The computer program product of claim 14, wherein the inner voltage threshold is determined based upon a mean time to failure model.

18. The computer program product of claim 14, wherein the outer voltage threshold is determined based upon a target failure time model.

19. The computer program product of claim 14, wherein the determining of the voltage-based process variation band thresholds includes determining: a width of the at least one physical feature, a spacing between the at least one physical feature and an adjacent physical feature, a net voltage of the at least one physical feature, and a net voltage of the adjacent physical feature.

* * * * *